US012646782B2

(12) United States Patent
Gu et al.

(10) Patent No.: US 12,646,782 B2
(45) Date of Patent: Jun. 2, 2026

(54) BATTERY APPARATUS

(71) Applicant: CALB Group Co., Ltd., Suzhou (CN)

(72) Inventors: Liangjie Gu, Changzhou (CN);
Junshan Guan, Changzhou (CN);
Tinglu Yan, Changzhou (CN); **Yongjie
Zhang**, Changzhou (CN)

(73) Assignee: CALB Group Co.,Ltd., Jiangsu (CN)

( * ) Notice: Subject to any disclaimer, the term of this
patent is extended or adjusted under 35
U.S.C. 154(b) by 684 days.

(21) Appl. No.: 18/181,506

(22) Filed: Mar. 9, 2023

(65) Prior Publication Data

US 2024/0039100 A1 Feb. 1, 2024

(30) Foreign Application Priority Data

Jul. 26, 2022 (CN) .......................... 202210886177.0

(51) Int. Cl.
*H01M 50/242* (2021.01)
*H01M 50/171* (2021.01)
*H01M 50/204* (2021.01)
(52) U.S. Cl.
CPC ....... *H01M 50/242* (2021.01); *H01M 50/171*
(2021.01); *H01M 50/204* (2021.01)
(58) Field of Classification Search
CPC ............. H01M 50/242; H01M 50/171; H01M
50/204; H01M 50/20
See application file for complete search history.

(56) References Cited

U.S. PATENT DOCUMENTS

| | | | |
|---|---|---|---|
| 9,166,209 | B2 | 10/2015 | Adachi |
| 2018/0287223 | A1 | 10/2018 | Meng et al. |

FOREIGN PATENT DOCUMENTS

| | | |
|---|---|---|
| CN | 214043891 | 8/2021 |
| CN | 216850164 | 6/2022 |
| EP | 4024568 | 7/2022 |

OTHER PUBLICATIONS

Machine Translation of: CN 216850164U, Gu et al., Jun. 28, 2022.*
"Search Report of Europe Counterpart Application", issued on Jul.
8, 2024, p. 1-p. 6.
"Examination report of India Counterpart Application", issued on
Dec. 11, 2025, p. 1-p. 6.

* cited by examiner

*Primary Examiner* — Kenneth J Douyette
(74) *Attorney, Agent, or Firm* — JCIP GLOBAL INC.

(57) ABSTRACT

The disclosure relates to the technical field of batteries, and
in particular, relates to a battery apparatus, and the battery
apparatus includes a battery pack. The battery pack includes
a plurality of batteries arranged in a first direction, terminal
components of the batteries are located on other surfaces of
the batteries except the top surfaces, and an insulating film
is provided on a top portion of the battery pack.

13 Claims, 5 Drawing Sheets

BATTERY APPARATUS

CROSS-REFERENCE TO RELATED APPLICATION

This application claims the priority benefit of China application serial no. 202210886177.0, filed on Jul. 26, 2022. The entirety of the above-mentioned patent application is hereby incorporated by reference herein and made a part of this specification.

BACKGROUND

Technical Field

The disclosure relates to the technical field of batteries, and in particular, relates to a battery apparatus.

Description of Related Art

In an existing battery apparatus, when the batteries swell and deform or when the battery apparatus vibrates and the box cover deforms, it is easy to cause the batteries to come into contact with the box cover, and a potential safety hazard may thus be generated in the battery apparatus.

SUMMARY

According to one aspect of the disclosure, the disclosure provides a battery apparatus including a battery pack. The battery pack includes a plurality of batteries arranged in a first direction, terminal components of the batteries are located on other surfaces of the batteries except the top surfaces, and an insulating film is provided on a top portion of the battery pack.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
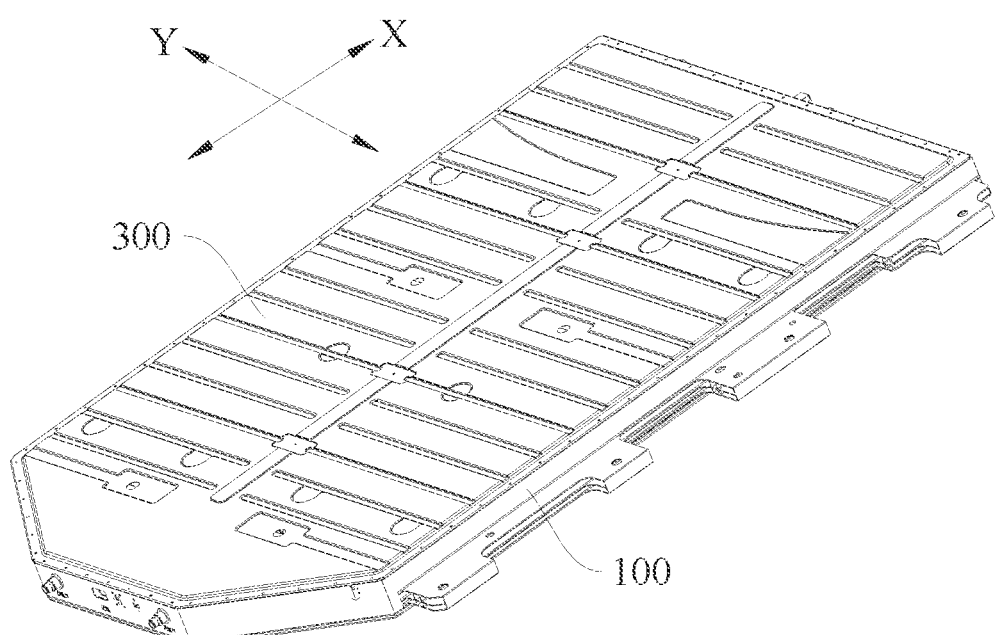
FIG. 1 is a schematic three-dimensional view illustrating a structure of a battery apparatus according to an exemplary embodiment.

With reference to FIG. 1, which is a schematic three-dimensional view illustrating a structure of a battery apparatus according to disclosure. In this exemplary embodiment, a vehicle-mounted battery is treated as an example of the battery apparatus provided by the disclosure. It is easy for a person having ordinary skill in the art to understand that, in order to apply the relevant design of the disclosure to other types of battery apparatuses, various modifications, additions, substitutions, deletions or other changes may be made to the following specific embodiments, and these changes still fall within the scope of the principle of the battery apparatus provided by the disclosure.

Figure 2:
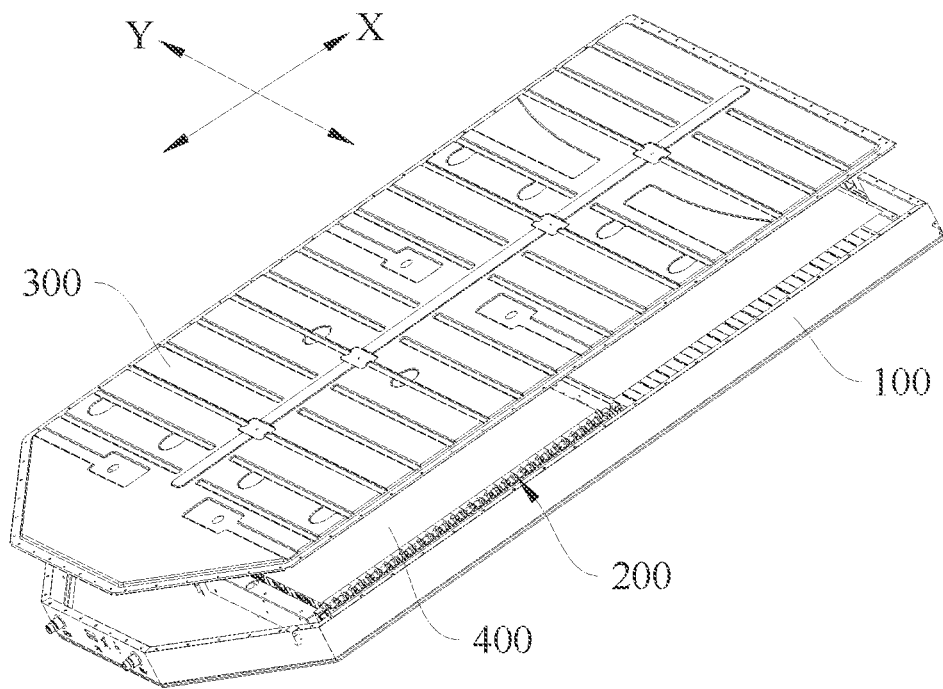
FIG. 2 is a schematic three-dimensional exploded view illustrating the battery apparatus of FIG. 1.
Figure 3:
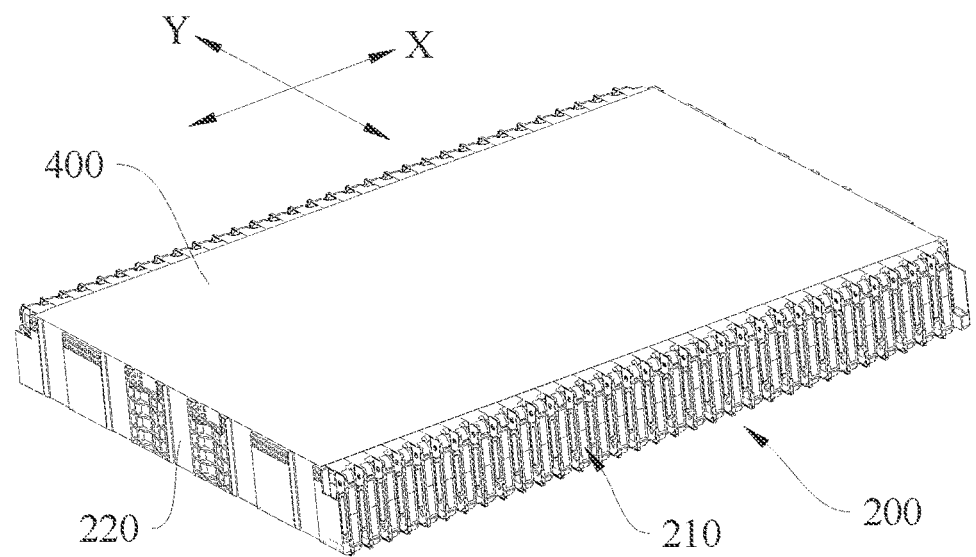
FIG. 3 is a schematic three-dimensional view illustrating part of the structure of the battery apparatus of FIG. 1.
Figure 4:
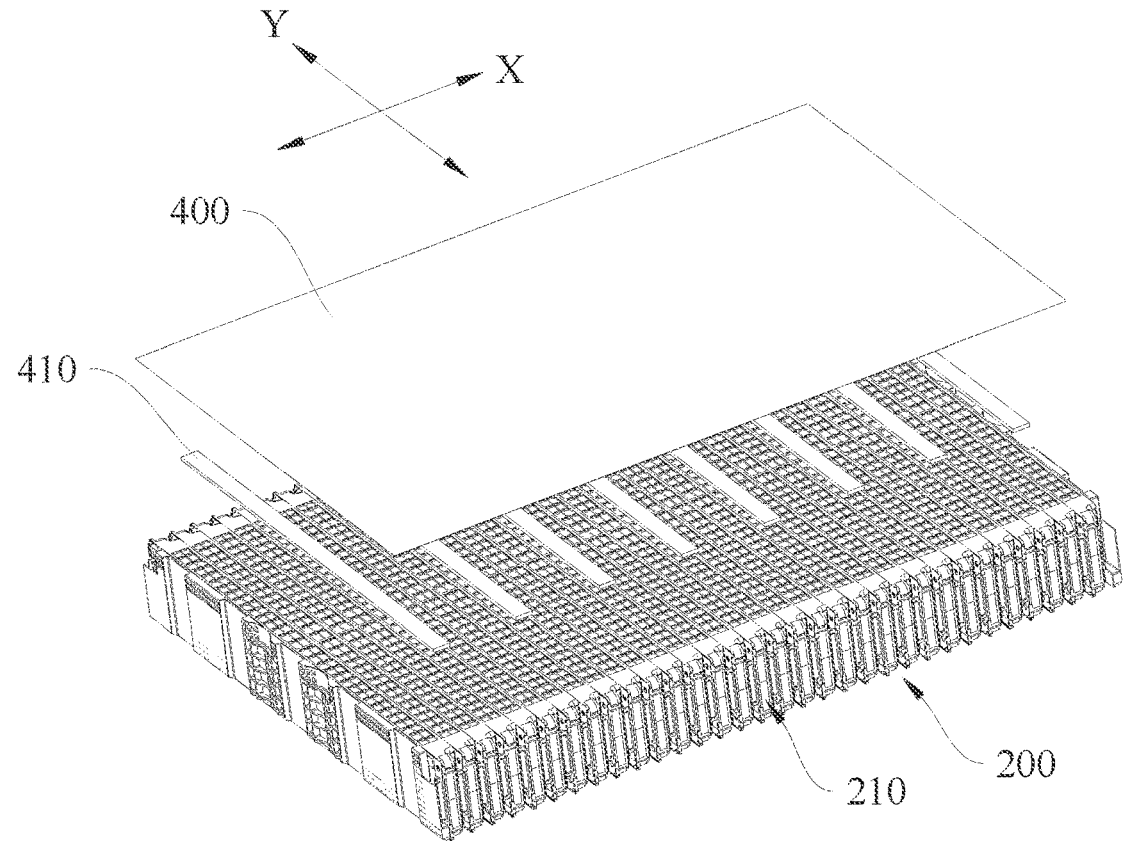
FIG. 4 is a schematic three-dimensional view illustrating the structure of the batteries of FIG. 2.

As shown in FIG. 1, in this embodiment, a battery apparatus provided by the disclosure includes a box body 100 and a battery pack 200, the battery pack 200 is accommodated in the box body 100, and the battery pack 200 includes a plurality of batteries 210 arranged in a first direction X. With reference to FIG. 2 to FIG. 4 together, FIG. 2 is a schematic three-dimensional exploded view illustrating the battery apparatus which embodies the principles of the disclosure. FIG. 3 is a schematic three-dimensional view illustrating part of the structure of the battery apparatus and specifically shows the three-dimensional structure of the combination of the battery pack 200 and an insulating film 400. FIG. 4 is a schematic three-dimensional view illustrating the structure of the batteries 210 of FIG. 2. Hereinafter, structures, connection manners, and functional relationships of the main components of the battery apparatus provided by the disclosure are described in detail with reference to the above-mentioned figures.

Figure 9:
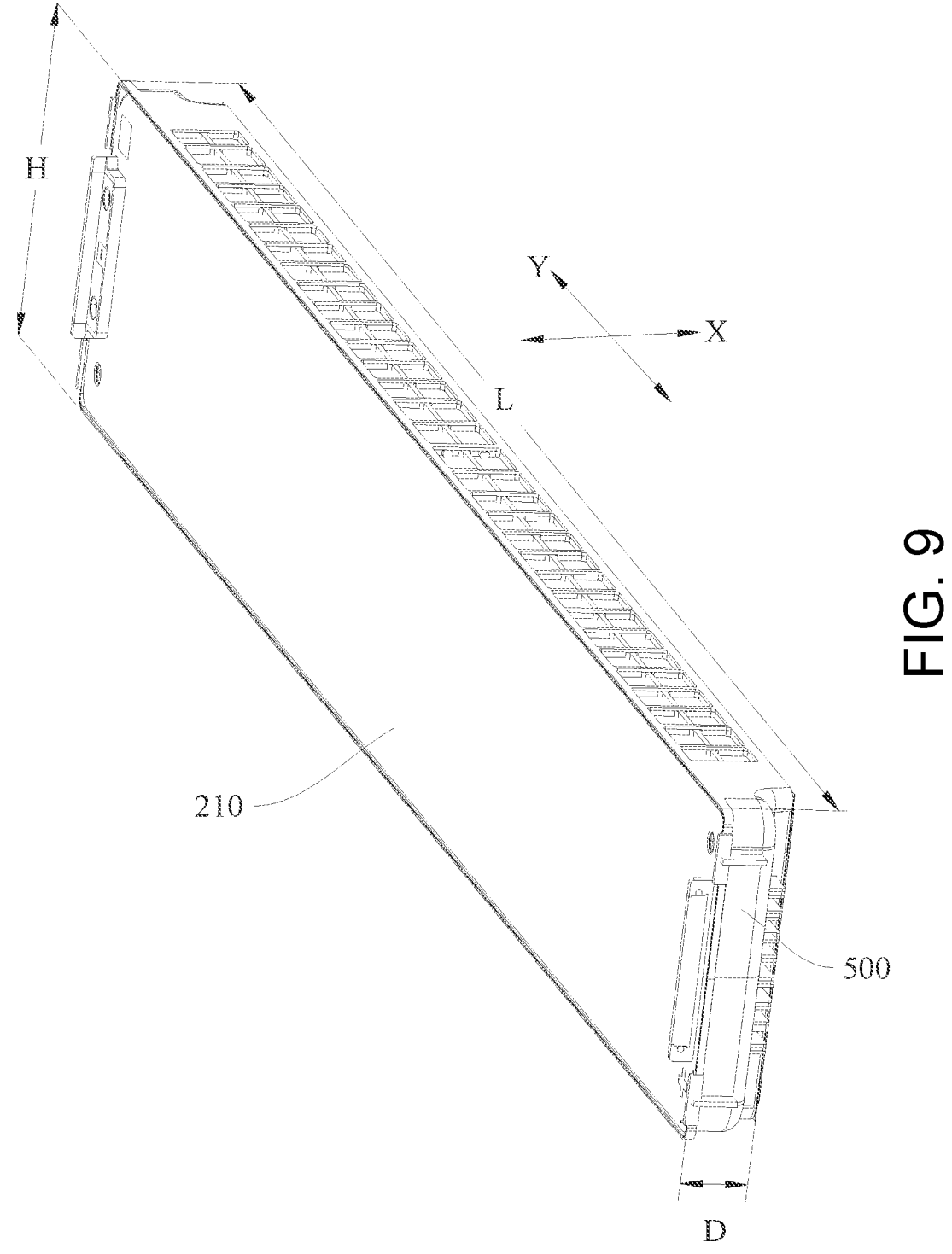
FIG. 9 is a local cross-sectional view illustrating part of the structure of the battery apparatus according to another exemplary embodiment.

As shown in FIG. 1 to FIG. 3, in an embodiment of the disclosure, terminal components of the batteries 100 are located on other surfaces of the batteries 100 except the top surfaces. For instance, the terminal components of the battery 100 shown in FIG. 9 is located on the side of the battery 100 that is perpendicular to the first direction, that is, the "large surface" of the battery 100. Since the terminal components are not disposed on the top surface of the battery 100, a collecting structure (e.g., collecting circuit board) of the battery 100 connected to the terminal components is not disposed on a top portion of the battery 100. That is, the top portion of the battery 100 does not have a film material for covering the collecting structure. Based on the above, the insulating film 400 is provided on the top portion of the battery pack 200. Through the foregoing design, in the disclosure, through the arrangement of the insulating film 400, when the batteries 210 swell and deform or when the battery apparatus vibrates and a box cover 300 deforms, the resulting contact between the battery pack 200 and the box cover 300 or other structures located above the battery pack 200 is prevented from occurring, and the potential safety hazard of the battery apparatus is thereby reduced. Further, the insulating film is easier to form than the insulating plate, especially the larger the size, the more difficult it is to form the insulating plate. The thickness of the insulating film is thinner, so that the top portion space and weight of the battery apparatus are saved. Besides, the insulating film is made of a flexible material and thus can be easily pressed, so that less space is additionally occupied. It should be noted that the swelling direction of a battery is in the direction perpendicular to the large surface of the battery. If the top portion of the battery is provided with a terminal component, it means that the tab of the battery needs to be connected to the terminal component, and a specific gap is certain to be left between the top cover of the battery apparatus and the battery. Therefore, even if the battery swells, it may not directly contact the top cover and may not cause deformation of the top cover, so an additional insulating film is not required to be provided on the top portion of the battery to achieve insulation.

In an embodiment of the disclosure, the insulating film 400 may be a single-layered film structure. In some embodiments, the insulating film 400 may be a multi-layered film structure.

In an embodiment of the disclosure, the insulating film 400 and the battery pack 200 may be bonded by adhesive. Through the above design, compared with the insulating plate, the insulating film may deform to a certain extent. Based on the design of adhesive bonding between the insulating film and the battery pack 200, when the batteries 210 swell and squeeze the insulating film 400, the insulating film 400 using the insulating film may deform and shrink. However, the deformation ability of the insulating plate is poor, so when the batteries 210 swell, it is easy to apply force on the insulating plate, resulting in failure of the connection between the insulating plate and the battery pack 200.

As shown in FIG. 2 and FIG. 3, based on the design that the insulating film 400 and the battery pack 200 are adhesively bonded, in an embodiment of the disclosure, the two ends of the battery pack 200 is the first direction X are provided with end portion structures. The end portion structures may be batteries 210 (i.e., the batteries 210 at the end portions of the battery pack 200 in the first direction X) or end plates 220 (at the end portions of the batteries 210 in the first direction X). Based on the above, the insulating film 400 may be adhesively bonded to at least two end portion structures of the battery pack 200. Through the above design, the insulating film 400 may span at least part of two batteries 210 at least. Accordingly, when the batteries 210 swell (for example, the "large surfaces" of the batteries 210 swell, and the "large surfaces" are the side surfaces of the batteries 210 perpendicular to the first direction X) and gaps are formed among the batteries 210, the insulating film 400 is pulled, and the deformation of the insulating film may absorb the aforementioned swelling force of the batteries 210.

As shown in FIG. 1 and FIG. 2, in an embodiment of the disclosure, the battery apparatus provided by the disclosure further includes the box cover 300. The box cover 300 is located above the insulating film 400, that is, the insulating film 400 is located between the box cover 300 and the battery pack 200. Based on the above, the insulating film 400 is adhesively bonded to the box cover 300. Through the foregoing design, in the disclosure, the insulating film 400 and the box cover 300 are fixed by means of gluing, so that the insulating film 400 and the box cover 300 may be fixed together when the material is supplied, and the insulating film 400 may be covered on the battery pack 200 when the box cover 300 is assembled. Accordingly, the assembly of the battery apparatus may be made more convenient, and the process step of fixing the insulating film 400 to the battery pack 200 is omitted.

As shown in FIG. 2 and FIG. 3, in an embodiment of the disclosure, the insulating film 400 may cover all the batteries 210 of the battery pack 200. Through the foregoing design, in the disclosure, when the batteries 210 swell, for example, when the "large surfaces" of the batteries 210 swell, resulting in the formation of gaps between adjacent batteries 210 and the insulating film 400 is pulled, the swelling force of the batteries 210 may be absorbed through the deformation of the insulating film 400. In some embodiments, the insulating film 400 may cover at least part of two adjacent batteries 210 of the battery pack 200 at least. Accordingly, the swelling force of the two adjacent batteries 210 may be absorbed at least through the deformation of the insulating film 400, which is not limited to this embodiment.

Figure 5:
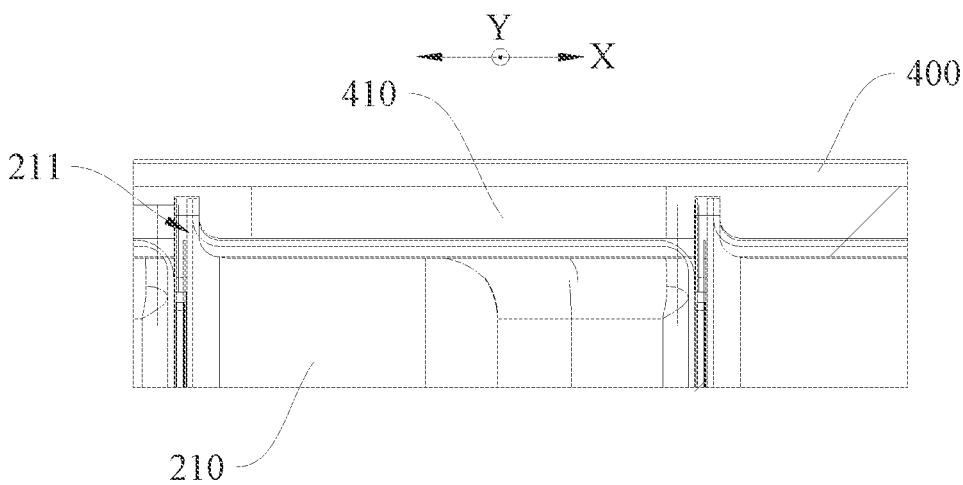
FIG. 5 is a schematic three-dimensional exploded view illustrating part of the structure of the battery apparatus according to another exemplary embodiment.
Figure 6:
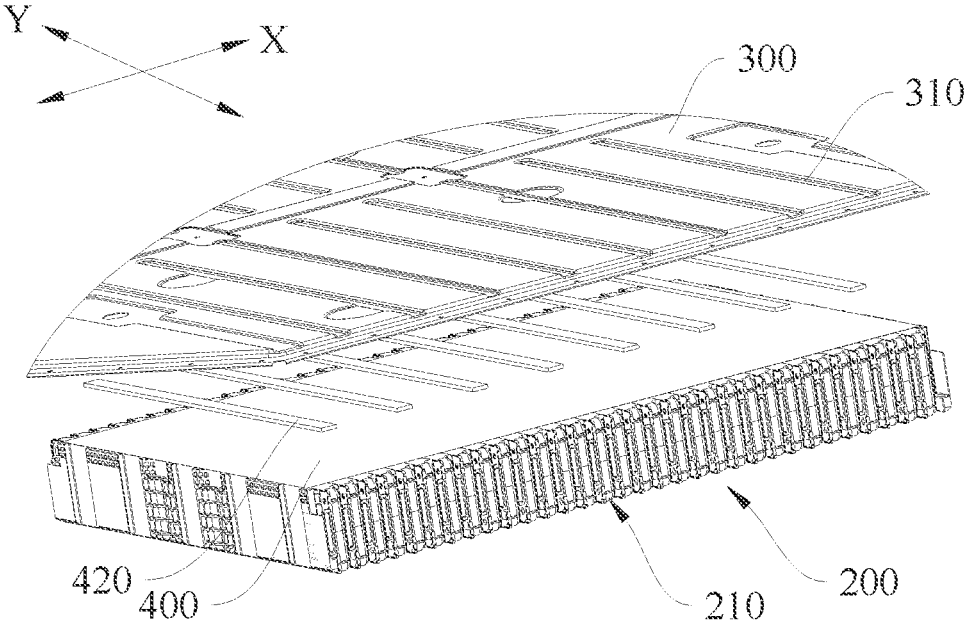
FIG. 6 is a local cross-sectional view illustrating part of the structure of the battery apparatus shown in FIG. 5.

With reference to FIG. 5 and FIG. 6, FIG. 5 is a schematic three-dimensional exploded view illustrating part of the structure of the battery apparatus which embodies the principles of the disclosure according to another exemplary embodiment. Herein, the three-dimensional structures of the insulating film 400 and the battery pack 200 in a disassembled state are specifically shown. FIG. 6 is a local cross-sectional view schematically illustrating part of the structure of the battery apparatus shown in FIG. 5.

As shown in FIG. 5 and FIG. 6, in an embodiment of the disclosure, a first buffer layer 410 may be disposed between the insulating film 400 and the battery pack 200. That is, the insulating film 400 is supported and fixed on the top surface of the battery pack through the first buffer layer 410, and the insulating film 400 is not directly connected to the battery pack 200. That is, a gap is provided between a portion of the insulating film 400 where the first buffer layer 410 is not provided and the battery pack 200. Through the foregoing design, in the disclosure, the swelling gaps of the batteries 210 may be reserved, and support may be provided by the first buffer layer. In this way, the problems of noise generated during vibration and insulation failure caused by the contact of the battery pack 200 with the structure above it (e.g., the box cover 300 and the like) during collision are prevented from occurring. Further, when the top portions of the batteries 210 have flange structures 211 such as flange edges, if the insulating film 400 directly covers the top portion of the batteries 210, the insulating film 400 using the insulating film may be pierced by the flange structures 211. Therefore, the first buffer layer 410 may also protect the insulating film 400 from being pierced by the flange structures 211.

As shown in FIG. 5, based on the design that the first buffer layer 410 is disposed between the insulating film 400 and the battery pack 200, in an embodiment of the disclosure, the first buffer layer 410 may be a strip-shaped structure extending in a second direction Y, and the second direction Y is perpendicular to the first direction.

As shown in FIG. 5, based on the design that the first buffer layer 410 is disposed between the insulating film 400 and the battery pack 200, in an embodiment of the disclosure, the top portions of the batteries 210 have the flange structures 211 protruding towards the insulating film 400, such as but not limited to flange edges. Based on the above, the first buffer layer 410 may be disposed between the flange structures 211 of at least two adjacent batteries 210. Through the foregoing design, in the disclosure, the limiting function of the first buffer layer 410 may be achieved by the flange structures 211 of two adjacent batteries 210.

Based on the design that the first buffer layer 410 is disposed between the insulating film 400 and the battery pack 200, in an embodiment of the disclosure, the first buffer layer 410 and the insulating film 400 may be adhesively bonded. Through the above design, sine the first buffer layer 410 may deform to a certain extent, based on the design of the adhesive bonding between the first buffer layer 410 and the battery pack 200, when the batteries 210 swell and squeeze the first buffer layer 410, the first buffer layer 410 may deform and shrink. The failure of the connection between the first buffer layer 410 and the insulating film 400 caused by force application on the first buffer layer 410 when the batteries 210 swell is prevented from occurring.

Based on the design that the first buffer layer 410 is disposed between the insulating film 400 and the battery pack 200, in an embodiment of the disclosure, the material of the first buffer layer 410 is buffer foam.

As shown in FIG. 5, based on the design that the first buffer layer 410 is disposed between the insulating film 400 and the battery pack 200, in an embodiment of the disclosure, a plurality of first buffer layers 410 may be disposed between the insulating film 400 and the battery pack 200, and the first buffer layers 410 are arranged at intervals in the first direction X. Through the foregoing design, in the disclosure, the swelling gaps of the batteries 210 may be reserved, and multiple positions of the insulating film 400 may be further supported and protected.

Based on the design that the first buffer layers 410 are disposed between the insulating film 400 and the battery pack 200, in an embodiment of the disclosure, the battery apparatus further includes the box cover 300, and the box cover 300 is located above the insulating film 400. Based on the above, the box cover 300 may have a plurality of ribs 310 protruding towards the insulating film 400, and the ribs 310 may correspond to the first buffer layers 410 one-to-one. Through the foregoing design, in the disclosure, the structural strength of the box cover 300 may be further increased by the ribs 310. Further, the ribs 310 are used to correspond to the first buffer layer 410, so that the first buffer layer 410 indirectly supports the ribs 310 through the insulating film 400, so that the box cover 300 is supported, and the box cover 300 is bonded to the battery pack 200. The box cover 300 is prevented from hitting the battery pack 200 during vibration, and noise is also prevented from being generated.

With reference to FIG. 9, FIG. 9 is a local cross-sectional view illustrating part of the structure of the battery apparatus which embodies the principles of the disclosure according to another exemplary embodiment.

As shown in FIG. 9, based on the arrangement that the first buffer layers 410 are disposed between the insulating film 400 and the battery pack 200 again, in an embodiment of the disclosure, a plurality of second buffer layers 420 may be disposed between the insulating film 400 and the box cover 300, and the second buffer layers 420 are arranged at intervals in the first direction X. Based on the above, the second buffer layers 420 may correspond to the first buffer layers 410 one-to-one. Through the above structural design, in the disclosure, support between the insulating film 400 and the battery pack 200 may be provided by the first buffer layer 410, and support between the insulating film 400 and the box cover 300 may be provided by the second buffer layer 420. Further, the first buffer layer 410 and the second buffer layer 420 are designed to have corresponding positions, so that the first buffer layer 410 and the second buffer layer 420 support the insulating film 400 on the same position of the insulating film 400. In this way, the support effect is further improved, and the deformation caused by the stress on one side (top portion or bottom portion) of supporting the insulating film 400 is prevented from occurring.

Figure 7:
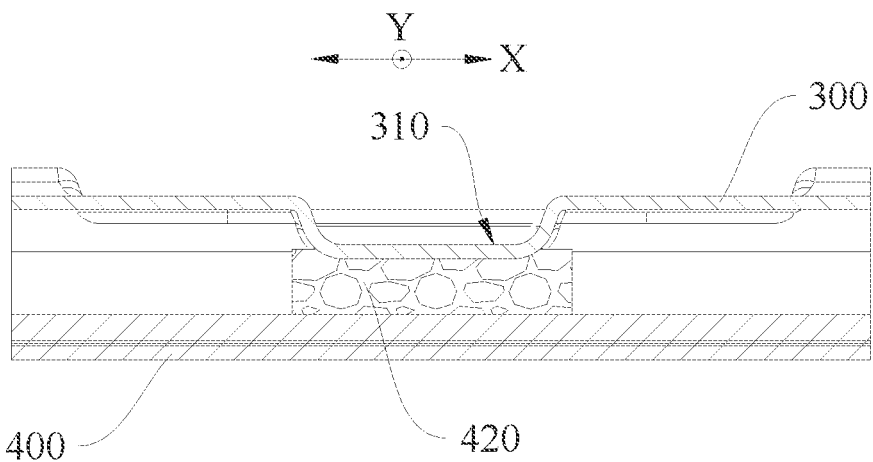
FIG. 7 is a schematic three-dimensional exploded view illustrating part of the structure of the battery apparatus according to another exemplary embodiment.
Figure 8:
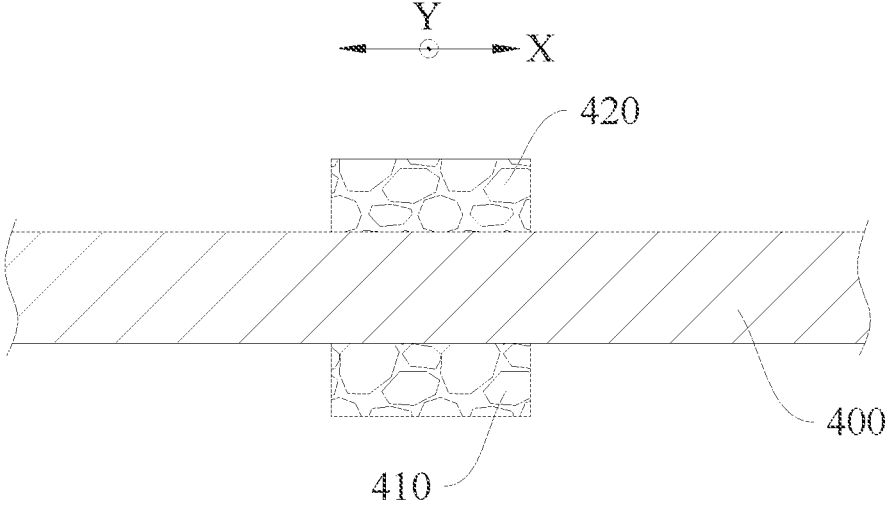
FIG. 8 is a local cross-sectional view illustrating part of the structure of the battery apparatus shown in FIG. 7.

With reference to FIG. 7 and FIG. 8, FIG. 7 is a schematic three-dimensional exploded view illustrating part of the structure of the battery apparatus which embodies the principles of the disclosure according to another exemplary embodiment. Herein, the three-dimensional structures of the insulating film 400 and the battery pack 200 in a disassembled state are specifically shown. FIG. 8 is a local cross-sectional view schematically illustrating part of the structure of the battery apparatus shown in FIG. 7.

As shown in FIG. 7 and FIG. 8, in an embodiment of the disclosure, the battery apparatus provided by the disclosure further includes the box cover 300. The box cover 300 is located above the insulating film 400, that is, the insulating film 400 is located between the box cover 300 and the battery pack 200. Based on the above, the second buffer layer 420 may be disposed between the insulating film 400 and the box cover 300. Through the above design, in the disclosure, support between the insulating film 400 and the box cover 300 may be achieved by the second buffer layer 420. Further, the assembly process of first fixing the insulating film 400 to the battery pack 200 through the second buffer layer 420 and then assembling the second buffer layer 420 may be realized, and the assembly efficiency is high.

As shown in FIG. 7, based on the design that the second buffer layer 420 is disposed between the insulating film 400 and the box cover 300, in an embodiment of the disclosure, the second buffer layer 420 may be a strip-shaped structure extending in the second direction Y, and the second direction Y is perpendicular to the first direction.

As shown in FIG. 7, based on the design that the second buffer layer 420 is disposed between the insulating film 400 and the box cover 300, in an embodiment of the disclosure, the top portions of the batteries 210 have the flange structures 211 protruding towards the insulating film 400, such as but not limited to flange edges. Based on the above, the area between the flange structures 211 of at least two adjacent batteries 210 may correspond to the position of the second buffer layer 420. In other words, for an orthographic projection on the bottom plate (not shown in the drawings) of the box body 100, the second buffer layer 420 is located between the flange structures 211 of two adjacent batteries 210, or when a plurality of the second buffer layers 420 are provided, at least one second buffer layer 420 is located between the flange structures 211 of two adjacent batteries 210.

Based on the design that the second buffer layer 420 is disposed between the insulating film 400 and the box cover 300, in an embodiment of the disclosure, the second buffer layer 420 and the insulating film 400 may be adhesively bonded. Through the above design, sine the second buffer layer 420 may deform to a certain extent, based on the design of the adhesive bonding between the second buffer layer 420 and the box cover 300, when the batteries 210 swell and squeeze the second buffer layer 420, the second buffer layer 420 may deform and shrink. The failure of the connection between the second buffer layer 420 and the insulating film 400 caused by force application on the second buffer layer 420 when the batteries 210 swell is prevented from occurring.

Based on the design that the second buffer layer 420 is disposed between the insulating film 400 and the box cover 300, in an embodiment of the disclosure, the material of the second buffer layer 420 is buffer foam.

As shown in FIG. 7, based on the design that the second buffer layer 420 is disposed between the insulating film 400 and the box cover 300, in an embodiment of the disclosure, a plurality of second buffer layers 420 may be disposed between the insulating film 400 and the box cover 300, and the second buffer layers 420 are arranged at intervals in the first direction X. Through the foregoing design, in the disclosure, support at multiple positions between the insulating film 400 and the box cover 300 may be further achieved.

Based on the design that the second buffer layers 420 are disposed between the insulating film 400 and the box cover 300, in an embodiment of the disclosure, the box cover 300 may have the plurality of ribs 310 protruding towards the insulating film 400, the ribs 310 may correspond to the second buffer layers 420 one-to-one, and the ribs 310 abut against the second buffer layers 420. Through the foregoing design, in the disclosure, the structural strength of the box cover 300 may be further increased by the ribs 310. Further, the ribs 310 abut against the second buffer layers 420, so that the second buffer layers 410 support the ribs 310, and the box cover 300 is thereby supported.

As shown in FIG. 9, based on the arrangement that the second buffer layers 420 are disposed between the insulating film 400 and the box cover 300 again, in an embodiment of the disclosure, a plurality of the first buffer layers 410 may be disposed between the insulating film 400 and the battery pack 200, and the first buffer layers 410 are arranged at intervals in the first direction X. Based on the above, the first buffer layers 410 may correspond to the second buffer layers 420 one-to-one. Through the above structural design, in the disclosure, support between the insulating film 400 and the box cover 300 may be provided by the second buffer layers 420, and support between the insulating film 400 and the battery pack 200 may be provided by the first buffer layers 410. Further, the first buffer layers 410 and the second buffer layers 420 are designed to have corresponding positions, so that the first buffer layers 410 and the second buffer layers 420 support the insulating film 400 on the same position of the insulating film 400. In this way, the support effect is further improved, and the deformation caused by the stress on one side (top portion or bottom portion) of supporting the insulating film 400 is prevented from occurring.

As shown in FIG. 2 and FIG. 3, in an embodiment of the disclosure, the insulating film 400 may be an integrated structure. Through the above design, in the disclosure, the structure is simplified, the number of components is reduced, and the assembly efficiency is improved.

In an embodiment of the disclosure, an insulating support 500 may be disposed on surfaces of the batteries 210, for example, the batteries 210 in FIG. 2 and FIG. 3 are actually marked at the location of the insulating support 500. Herein, portions of the insulating support 500 at the top portions of the batteries 210 may be provided with openings. Through the foregoing design, in the disclosure, through the openings of the insulating support 500 on the top portions, the mistake-proofing function may be provided during the assembly process.

As shown in FIG. 4, in an embodiment of the disclosure, in the second direction Y, a length L of each of the batteries 210 may be 400 mm to 2,500 mm. Based on the above, a thickness D of the battery 210 in the first direction X accounts for 1/50 to 1/2 of the length L of the battery 210, and the ratio of a height H of the battery 210 in a height direction to the thickness D of the battery 210 in the first direction X is 0.05 to 2.

Further, in an embodiment of the disclosure, the thickness D of the battery 210 may specifically be 50 mm to 200 mm, such as 50 mm, 100 mm, 150 mm, 200 mm, etc.

Further, in an embodiment of the disclosure, the height H of the battery 210 may specifically be 10 mm to 100 mm, such as 10 mm, 30 mm, 50 mm, 100 mm, etc.

Further, in an embodiment of the disclosure, the ratio of the thickness D of the battery 210 to the length L of the battery 210 may further be 1/25 to 1/4, such as 1/25, 1/10, 1/5, 1/4, etc.

Further, in an embodiment of the disclosure, the ratio of the height H of the battery 210 to the thickness D of the battery 210 may further be 0.1 to 0.5, such as 0.1, 0.2, 0.3, 0.5, etc.

Regarding the battery 210 provided in the foregoing embodiment, in the case where sufficient energy density is ensured, the ratio of the length L to the thickness D of the battery 210 is larger, and further, the ratio of the thickness D to the height H of the battery 210 is larger.

In an embodiment of the disclosure, the ratio of the thickness D of the battery 210 to the length L of the battery 210 may further be 1/7 to 1/4, such as 1/7, 1/6, 1/5, 1/4, etc. That is, the ratio of the length L to the thickness D of the battery 210 is relatively large, and in this way, the energy density of the battery 210 is increased, and subsequent formation of the battery pack 200 may also be conveniently performed.

In an embodiment of the disclosure, the ratio of the height H of the battery 210 to the thickness D of the battery 210 may be 1/7 to 1/3. That is, the ratio of the thickness D to the height H of the battery 210 is larger, and in this way, under the condition that sufficient energy density is ensured, formation of the battery pack 200 may be conveniently performed.

Further, in an embodiment of the disclosure, the length L of the battery 210 may further be 500 mm to 1,500 mm, the thickness D of the battery 210 may further be 80 mm to 150 mm, and the height of the battery 210 may further be 15 mm to 25 mm.

It should be noted that each medium size of the battery 210 shown in FIG. 4 is marked with the overall size of the battery 210 with the insulating support 500 disposed on the surface thereof. That is, the identifications of the dimensions in the related drawings include the dimensions of the insulating support 500. It should be understood that in the description of the abovementioned various embodiments of the specification, it can be understood that the values of each dimension or the relationship between different dimensions includes the dimension of the insulating support 500. It can also be understood that the value of each dimension or the relationship between different dimensions ignores the dimension of the insulating support 500. That is, the smaller size of the insulating support 500 relative to the size of the battery 210 is regarded as not affecting the relevant values or relationships.

In view of the foregoing, the battery pack 200 of the battery apparatus of the disclosure is provided with the insulating film 400. Through the foregoing design, in the disclosure, through the arrangement of the insulating film 400, when the batteries 210 swell and deform or when the battery apparatus vibrates and the box cover 300 deforms, the resulting contact between the battery pack 200 and the box cover 300 or other structures located above the battery pack 200 is prevented from occurring, and the potential safety hazard of the battery apparatus is thereby reduced. Further, the insulating film is easier to form than the insulating plate, especially the larger the size, the more difficult it is to form the insulating plate. The thickness of the insulating film is thinner, so that the top portion space and weight of the battery apparatus are saved. Besides, the insulating film is made of a flexible material and thus can be easily pressed, so that less space is additionally occupied.

Note that the battery apparatus shown in the drawings and described in the specification are only a few examples of many types of battery apparatus that may adopt the principles of the disclosure. It should be clearly understood that the principles of the disclosure are by no means limited to any details or any components of the battery apparatus shown in the drawings or described in the specification.

Other embodiments of the disclosure will be apparent to those skilled in the art from consideration of the specification and practice of the disclosure disclosed herein. The disclosure is intended to cover any variations, uses or adaptations of the disclosure. These variations, uses or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery apparatus comprising a battery pack, wherein the battery pack comprises a plurality of batteries arranged in a first direction, terminal components of the batteries are located on other surfaces of the batteries except top surfaces, and an insulating film is provided on a top portion of the battery pack, wherein a first buffer layer is provided between the insulating film and the battery pack, wherein a plurality of the first buffer layers are provided between the insulating film and the battery pack, and the first buffer layers are arranged at intervals in the first direction, and wherein:

the battery apparatus further comprises a box cover, and the box cover is located above the insulating film, wherein the box cover has a plurality of ribs protruding towards the insulating film, and the ribs correspond to the first buffer layers one-to-one, and/or a plurality of second buffer layers are provided between the insulating film and box cover, the second buffer layers are arranged at intervals in the first direction, and the second buffer layers correspond to the first buffer layers one-to-one.

2. The battery apparatus according to claim 1, wherein the insulating film is adhesively bonded to the battery pack.

3. The battery apparatus according to claim 2, wherein both ends of the battery pack in the first direction have end portion structures, and the end portion structures are batteries or end plates, wherein the insulating film is adhesively bonded to the two end portion structures of the battery pack.

4. The battery apparatus according to claim 1, wherein the insulating film is adhesively bonded to the box cover.

5. The battery apparatus according to claim 1, wherein the insulating film covers at least portions of at least two adjacent batteries.

6. The battery apparatus according to claim 1, wherein:

top portions of the batteries have flange structures protruding towards the insulating film, and the first buffer layer is provided between the flange structures of at least two adjacent batteries, the first buffer layer is adhesively bonded to the insulating film, and/or the material of the first buffer layer is buffer foam.

7. The battery apparatus according to claim 1, wherein a second buffer layer is provided between the insulating film and the box cover.

8. The battery apparatus according to claim 7, wherein a plurality of the second buffer layers are provided between the insulating film and the box cover, and the second buffer layers are arranged at intervals in the first direction.

9. The battery apparatus according to claim 7, wherein:

top portions of the batteries have flange structures protruding towards the insulating film, and an area between the flange structures of at least two adjacent batteries corresponds to a position of the second buffer layer, and/or the second buffer layer is adhesively bonded to the insulating film, and/or the material of the second buffer layer is buffer foam.

10. The battery apparatus according to claim 1, wherein the insulating film has an integrated structure.

11. The battery apparatus according to claim 1, wherein an insulating support is provided on surfaces of the batteries, and portions of the insulating support located at top portions of the batteries are provided with openings.

12. The battery apparatus according to claim 1, wherein in a second direction perpendicular to the first direction, a length of each of the batteries is 400 mm to 2,500 mm: wherein a thickness of the battery in the first direction accounts for 1/50 to 1/2 of the length of the battery, and the ratio of a height of the battery in a height direction to the thickness of the battery in the first direction is 0.05 to 2.

13. A battery apparatus comprising a battery pack and a box cover, wherein the battery pack comprises a plurality of batteries arranged in a first direction, terminal components of the batteries are located on other surfaces of the batteries except top surfaces, and an insulating film is provided on a top portion of the battery pack, wherein the box cover is located above the insulating film, and a second buffer layer is provided between the insulating film and the box cover, a plurality of the second buffer layers are provided between the insulating film and the box cover, and the second buffer layers are arranged at intervals in the first direction, the box cover has a plurality of ribs protruding towards the insulating film, the ribs correspond to the second buffer layers one-to-one, and the ribs abut against the second buffer layers, and/or a plurality of first buffer layers are provided between the insulating film and the battery pack, the first buffer layers are arranged at intervals in the first direction, and the first buffer layers correspond to the second buffer layers one-to-one.

\* \* \* \* \*